United States Patent [19]

Gibson et al.

[11] 4,315,277

[45] Feb. 9, 1982

[54] NON-LINEAR APERTURE CORRECTION CIRCUIT HAVING A SIGNAL BYPASS ARRANGEMENT

[75] Inventors: Walter G. Gibson; Theodor M. Wagner, both of Princeton, N.J.

[73] Assignee: RCA Corporation, New York, N.Y.

[21] Appl. No.: 122,723

[22] Filed: Feb. 19, 1980

[51] Int. Cl.³ .................... H04N 5/78; H04N 5/76
[52] U.S. Cl. .................................. 358/8; 358/128.5; 360/36
[58] Field of Search ............... 358/8, 128.5, 4, 127; 360/33, 36

[56] References Cited

U.S. PATENT DOCUMENTS

| | | | |
|---|---|---|---|
| 3,879,748 | 4/1975 | DeBoer | 358/8 |
| 3,934,263 | 1/1976 | Palmer | 358/4 |
| 3,984,867 | 10/1976 | Harnandez | 358/127 |
| 4,124,208 | 2/1979 | Oprandi et al. | 358/127 |
| 4,150,395 | 4/1979 | Pritchard | 358/8 |
| 4,166,251 | 8/1979 | Ishigaki et al. | 329/132 |

*Primary Examiner*—Daryl W. Cook
*Attorney, Agent, or Firm*—E. M. Whitacre; J. S. Tripoli; J. E. Roehling

[57] ABSTRACT

In a video disc playback system non-linear intermodulation distortions are effected during playback by the pick-up stylus. These distortions cause disturbing visual beats in the reproduced images. A first signal path at the output of the pick-up circuitry transfers the main video signal with negligible phase shift over a given band of frequencies. A second signal path which parallels the first path effects a modulation of the video signals by the interferring signals (i.e., sound signals). The signals from the first and second paths are combined to effect a substantial removal of the interfering intermodulation products.

7 Claims, 3 Drawing Figures

NON-LINEAR APERTURE CORRECTION CIRCUIT HAVING A SIGNAL BYPASS ARRANGEMENT

The present invention relates generally to apparatus for reproducing information from a record medium and, more particularly, to non-linear systems incorporated in a reproducing apparatus for reducing intermodulation distortion between video and audio information during playback of a disc-shaped record medium.

In U.S. Pat. No. 3,842,194, issued on Oct. 15, 1974 to Jon K. Clemens, video disc playback systems of a variable capacitance form are disclosed. In one arrangement for a playback system, an information track incorporating geometric variations representative of video and sound signals is provided on the surface of a disc having conductive properties. A stylus having a conductive electrode is used in the process of sensing variations in the capacitance presented between the conductive properties of the disc and the conductive electrode of the stylus.

In one format employed in the Clemens' patent, a composite color video signal which is frequency modulated over a high frequency deviation range (illustratively, 4.3–6.3 MHz) is recorded in the bottom of a grooved information track along with sound signals which are modulated over a low frequency deviation range (illustratively, 716±50 KHz). In a format proposed by D. H. Pritchard in U.S. Pat. No. 3,872,498, issued on Mar. 18, 1975, the chrominance information of the composite color video signal is modulated on a subcarrier of the general form employed in the well-known NTSC system. In the Pritchard system, the chrominance component is buried in the low portion (illustratively, a subcarrier frequency of 1.53 MHz with color subcarrier side bands extending ±500 KHz thereabout) of the video band.

One embodiment of a stylus assembly described in the Clemens' patent comprises a dielectric mounting structure (e.g., diamond) having a conducting element deposited on the rear surface thereof. Disturbing intermodulation distortions may be generated during playback of a record disc with a pick-up stylus of the aforementioned type.

When two or more signals are passed through a system having a non-linear response, intermodulation products are produced. The output of the non-linear system contains not only the original signals but also intermodulation distortions which are cross products of the original signals. For example, the output of a non-linear device such as a diode biased to the "knee" of its response curve will contain the original signals, first order intermodulation products, such as $S_1$ ($f_1$) and $S_2$ ($f_2$), where $f_1$ and $f_2$ represent the frequencies of the signals $S_1$ and $S_2$ respectively, along with second order distortion signals (i.e., $S_3$ ($f_1+f_2$); $S_4$ ($f_1-f_2$); $S_5$ ($2f_1$); $S_6$ ($2f_2$)); third order distortion signals (i.e., $S_7$ ($f_1-2f_2$); $S_8$ ($f_1+2f_2$); $S_9$ ($2f_1-f_2$); $S_{10}$ ($2f_1+f_2$); $S_{11}$ ($3f_1$); $S_{12}$ ($3f_2$)); etc. The non-linearities of the video disc system may effect intermodulation distortion which causes disturbing visual effects.

In the Clemens' format where the video signal is modulated on a high frequency carrier and the sound is modulated on a low frequency carrier the sound signals effect a modulation of the video signals which in turn results in disturbing visual beats in the reproduced image. It is felt that these interference distortions may be caused by certain non-linear characteristics of the playback stylus (e.g., in the asymmetrical Clemens' stylus described above the electric field may be concentrated on the dielectric side of the pick-up such that the stylus effectively "sees" the signal at an oblique angle rather than directly beneath the conductive electrode).

In the U.S. Patent Application, Ser. No. 075,330 filed on Sept. 19, 1979, which is a continuation-in-part of application Ser. No. 951,382 filed on Oct. 16, 1978 for J. J. Gibson, a non-linear aperture corrector for reducing intermodulation distortion in reproduced video signals and, specifically, for reducing sound distortion in the video signal is provided in the video disc playback apparatus. In one embodiment described therein the main video signal is integrated as it is transferred through the non-linear corrector. To effect a response which is nearly flat, the main video signal is also differentiated—the differentiation being complementary to the integration. Although the distortions introduced by the non-linear characteristics of the pick-up stylus are compensated for in the Gibson non-linear compensator circuit, some undesirable effects may be introduced by the group delay of the integration and differentiation networks. For example, in the buried subcarrier format of the Pritchard patent a large group delay occurs around 2 MHz which generates a 3.06 MHz beat (i.e., the second harmonic of the baseband 1.53 MHz chroma) due to the FM nature of the signal.

In accordance with the principles of the present invention a non-linear compensator circuit is provided for reducing intermodulation distortions in a video signal output which does not effect an undesirable group delay in the video signal.

In accordance with the present invention, a disc record player is described for information recovery of video and sound signals. The player includes means for recovering modulated information signals including composite color video signals occupying a given band of frequencies with sound accompaniment from a disc record. Intermodulation distortion between the video and sound signals is effected by the recovery means. Further, the player includes means for demodulating the information signals and means, coupled to the demodulating means, for processing the demodulated signals. Coupled to the recovery means is a non-linear compensator for effecting a substantial removal of intermodulation distortion. The non-linear compensator comprises a first signal path and a second signal path. The video signals are transferred via the first signal path with negligible phase shift over the given band of frequencies to a summing node. The video signals transferred by the second signal path to the summing node are modulated by the sound signals to generate intermodulation products (i.e., correction signals) complementary to the intermodulation distortion. The combination of the signals from the first signal path and the second signal path at the summing node is substantially free of the intermodulation distortions.

According to a further feature of the invention, additional non-linear compensation circuits may be added to effect removal of other non-linear distortions with much less interaction and complexity since the main video signal is transferred to the summing node without being passed through each non-linear compensation circuit.

Other features and advantages of the invention will be more fully understood from the following detailed description of the preferred embodiment, the appended claims, and the accompanying drawing in which:

FIG. 3 illustrates, via block diagram representation, another embodiment of the non-linear aperture corrector of FIG. 1.

Figure 1:
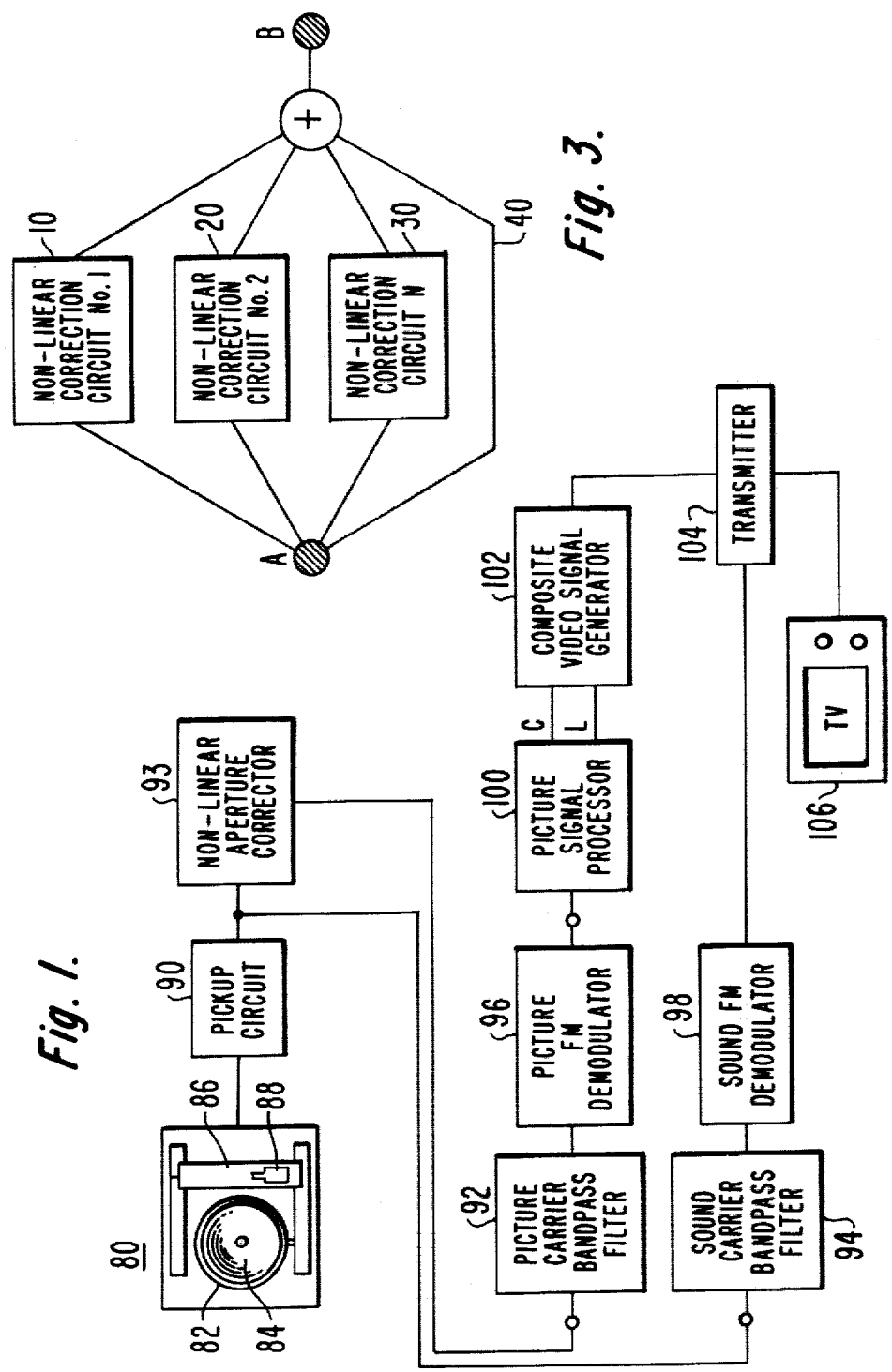
FIG. 1 illustrates, via a block diagram representation, playback apparatus, including a non-linear aperture correction stage, embodying the principles of the present invention.

Referring now to FIG. 1, a video disc player 80 has a turntable 82 for rotatably supporting a video disc 84 having a spiral information track containing video signal information with sound signal information accompaniment. The player 80 further includes a carriage 86 which is subject to translation in synchronism with the radial motion of the player stylus during playback. The carriage 86 has a compartment for receiving a cartridge 88 which houses the signal pick-up stylus.

A pick-up circuit 90 responsive to the output of the signal pick-up, develops at its output terminal, a signal representative of the recorded information. The signal at the output terminal of pick-up circuit 90 may contain sound interference in the video effected by the signal pick-up stylus. The pick-up circuit 90 is illustratively of the type described in U.S. Pat. No. 4,070,625, issued on Mar. 21, 1978 to Kawamoto, et al. The output signal from the pick-up circuit 90 is delivered to a non-linear aperture corrector 93 and to a sound carrier bandpass filter 94. The aperture corrector reduces the interference effected by the non-linear response of the recovery means. Specific embodiments of the aperture corrector 93 will be discussed with reference to FIGS. 2 and 3, infra.

The output signal from non-linear aperture corrector 93 is delivered to bandpass filter 92. The picture carrier bandpass filter 92 has a relatively wide passband encompassing the deviation range of the high frequency picture carrier (e.g., 4.3–6.3 MHz) as well as the requisite adjacent sideband regions, and selectively passes the picture carrier component of the recorded signal to the relative exclusion of the sound carrier component thereof.

The sound carrier bandpass filter 94 has a relatively narrow passband encompassing the deviation range of the low frequency sound carrier(s) (e.g., 716 and 905 KHz) as well as the requisite adjacent sideband regions, and selectively passes the sound carrier components of the recorded signal to the relative exclusion of the picture carrier component. The output signals from the respective bandpass filters 92 and 94 are passed to respective demodulators 96 and 98. The picture demodulator 96 develops at its output terminal the recorded picture signal information inclusive of synchronizing components and, the sound demodulator 98 develops the recorded audio signal information at its output terminal.

The picture signal processor 100, coupled to the picture demodulator 96, effects a separation of the chrominance information from the luminance information. A composite video signal generator 102 recombines the chrominance and luminance information in accordance with, for example, the NTSC format. A transmitter 104 processes the sound, luminance and chrominance information to form a suitable signal at an appropriate frequency for delivery to a color TV receiver 106. Receiver 106 then displays the color image and provides the audio information developed in accordance with the information signal previously recorded on video disc 84.

Figure 2:
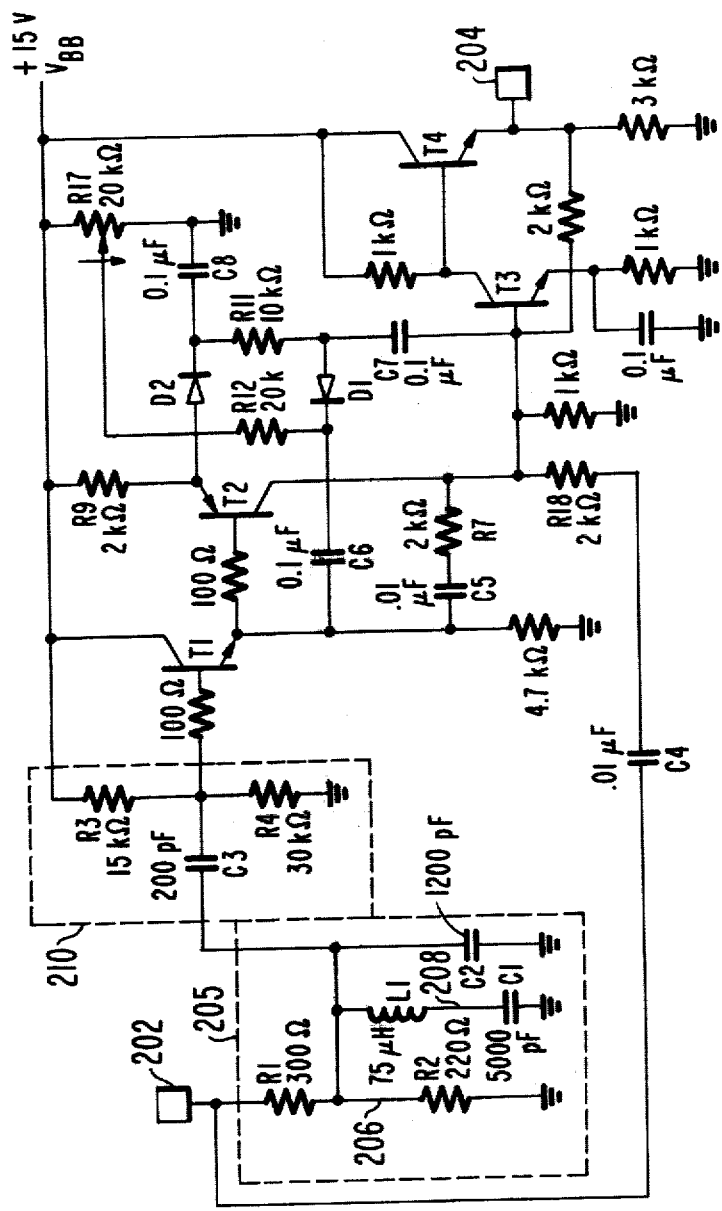
FIG. 2 is a schematic diagram of an embodiment of the non-linear aperture corrector of FIG. 1.

FIG. 2 illustrates an embodiment for the non-linear aperture corrector 93 of FIG. 1. The output signal from a pick-up circuit 90 of FIG. 1 is applied to the input terminal 202 of FIG. 2 and the output terminal 204 of FIG. 2 is connected to picture carrier bandpass filter 92 of FIG. 1.

Referring to FIG. 2, input terminal 202 is connected to input network 205. Voltage divider 206, within input network 205, comprises resistors R1 and R2 connected in series. Trap filter 208, which comprises inductor L1 and capacitor C1 connected in series, is connected in parallel with resistor R2 of divider 206. In parallel combination with resistor R2 and trap 208 is capacitor C2.

High pass filter 210 which includes capacitor C3 and resistors R3 and R4 is connected to the output line of input network 205. Emitter follower transistor T1 has its base electrode connected to the output of high pass filter 210 via a small (100 ohm) resistor.

The currents from four signal paths are summed at the base of transistor T3. The first path, which is the main path for the video signal, connects input terminal 202 through capacitor C4 and resistor R18 to the base of transistor T3. This first path provides a negligible amount of phase shift to the signals in the frequency band of interest transferred thereby. Capacitor C4 which blocks the passage of DC is chosen such that it effects negligible phase shift to signals at the frequencies of interest. The second path includes diode D1, which is a non-linear device, and capacitors C6 and C7. The second path provides one of the two legs of a balanced non-linear aperture correction circuit. The PNP transistor T2 is included in the third path. Diode D2, which is connected to the emitter of inverter transistor T2, provides a non-linear impedance which changes the gain of transistor T2 in a non-linear fashion. The path from the emitter of emitter-follower T1 through the inverter stage T2 to the summing point, the base of transistor T3, provides the second leg of the balanced non-linear aperture correction circuit. The fourth path is provided through the series connection of capacitor C5 and resistor R7. This last signal path is present to compensate for the signal of opposite polarity which flows through resistor R9 and the emitter-electrode of transistor T2. If the current source were ideal, signal path four could be eliminated.

The cathode of diode D2 is connected to the anode of diode D1 through resistor R11 and the cathode of diode D1 is connected to the slider arm of potentiometer R17 through a resistor R12. A positive bias voltage $V_{BB}$ is applied to the anode of diode D2 through resistor R9. Additionally, the cathode of diode D2 is connected to ground through a signal path which includes capacitor C8. Capacitor C6 is connected between the emitter of transistor T1 and the cathode of diode D1 and capacitor C7 is connected between the anode of diode D1 to the summing point at the base of transistor T3.

In operation, the output from pick-up circuit 90 of FIG. 1 contains non-linear distortions which may result in sound signal interference in the video output display. The non-linear aperture corrector of FIG. 2 effects a substantial removal of these non-linearities. The divider network 206, which is connected to input terminal 202, reduces the level of the input signal so that the signal across the diodes is less than 100 mv peak-to-peak to ensure that the diodes operate within the "knee" of their respective response curves. Further, divider 206 provides a resistive source impedance for input network 205. Trap filter 208 is arranged to remove control signals of a particular frequency (e.g., 260 KHz). Above the resonant frequency of trap filter 208, inductor L1 becomes the dominating reactance element and resonates in parallel with capacitor C2 at a frequency which is in the vicinity of the sound carrier(s) (e.g., 716 and 905 KHz). The relative phase of the sound carrier and the video carrier must be controlled to provide proper phase alignment. Thus, capacitor C2 is provided to establish proper phasing of the sound carrier. Above the sound carrier frequencies, capacitor C2 dominates and network 205 functions as an integrator. Network 205 provides approximately a 6 db/octave slope for all of the video information passing therethrough, reduces the amplitude of the video and shifts the phase of the video carrier by nearly 90°.

The next section which is the high pass filter 210 has a low frequency cutoff (e.g., 80 KHz). Any low frequency noise which may cause unwanted phase modulation in the video carrier is filtered out in this stage.

The non-linear aperture correction stage comprises, inter alia, diodes D1 and D2, inverter transistor T2, and resistor R18.

Diodes D1 and D2 which are arranged in series, may be bias controlled by a single potentiometer R17. Diodes D1 and D2 are arranged with respect to an AC signal in a balanced configuration such that odd order intermodulation products between the sound and the video are reduced or eliminated. Since diodes D1 and D2 are biased with the same biasing current, the fundamental sound and video signals plus odd order distortions thereof in the signal which are passed through the collector of transistor T2 to the summing point at the base of transistor T3 are balanced with the fundamental sound and video signals plus odd order distortions thereof which are passed through diode D1 to the summing point at the base of transistor T3. With the odd order intermodulation products through diode D1 180° out of phase with the odd order intermodulation products through the collector of transistor T2, all odd order intermodulation products are substantially eliminated.

Simultaneously, even order distortions (e.g., second order) are substantially eliminated by the modulating effect of the combination of the two non-linear and one linear signal paths. The signal at the emitter of T1 is nearly 90° out of phase with the signal at the input terminal 202. It can be seen that the non-linear elements D1 and D2 pass the video carrier to the summing node (base of T3) either with the same polarity through D1 for negative portions of the audio carriers or inverted through T2 for positive portions of the audio carrier. Thus, the non-linear elements may be considered to be generating intermodulation products that are in phase with the signal at the emitter of T1. The main signal, which is passed through capacitor C4 and resistor R18 with negligible phase shift over the given frequency band of operation, is now in quadrature with respect to the intermodulation products generated by diodes D1 and D2. The result of the diode operation is a phase modulation of the video carrier by the audio carrier. The amplitude of the intermodulation products produced, and, therefore, the amount of phase modulation, is a function of the diode bias current which may be adjusted such that the phase modulation effected in diodes D1 and D2 substantially cancels the phase modulation effected by the non-linear recovery means.

For another explanation of the operation of the non-linear aperture corrector, consider a signal S(t) at input terminal 202 having even order (e.g., second order) intermodulation products produced by the recovery means. The diodes D1 and D2 will contribute even order distortion components (e.g., $S^2(t)$) which are "in phase" with the integrated signal S(t) at the emitter of transistor T1. In particular, the diode current will contain audio sidebands to the video carrier (e.g., signals at $5\pm0.716$ MHz and $5\pm0.905$ MHz). Simultaneously, the main video signal is conveyed through resistor R18 in quadrature with the signal at the emitter of transistor T1. The combination of these two signals at the summing node (e.g., base of transistor T3) contains substantially no intermodulation products since the sidebands generated by the diodes D1 and D2 effectively cancel the sidebands which were generated in the original signal by the non-linear recovery device.

Referring to FIG. 3, another embodiment of the non-linear aperture corrector 93 of FIG. 1 is illustrated. Since the main video signal passes through a signal path which bypasses the non-linear generator, a multiplicity of non-linear correction circuits 10, 20, 30 may be connected in parallel with the main video path 40. In this arrangement, non-linear correction circuit 10 may be used to eliminate an intermodulation product effected by a sound carrier at a first frequency (e.g., 716 KHz), non-linear correction circuit 20 may be used to eliminate an intermodulation product effected by a sound carrier at a second frequency (e.g., 905 KHz), and non-linear correction circuit 30 may be used to eliminate a third signal which could be either a high frequency or a low frequency signal which produces an intermodulation distortion. In the present arrangement each intermodulation distortion may be reduced or eliminated by a corresponding non-linear correction circuit coupled in parallel with the main video signal path.

What is claimed is:

1. In a disc record player for information recovery of video and sound signals, said player including means for recovering modulated information signals including composite color video signals occupying a given band of frequencies with sound accompaniment from a disc record, said recovery means effecting intermodulation distortion between said video and sound signals, means for demodulating said information signals, means, coupled to said demodulating means, for processing said demodulated signals, and a non-linear compensator, coupled to said recovery means, for effecting a substantial removal of said intermodulation distortion, said non-linear components comprising:

a terminal, coupled to said recovery means;
   a first signal path, coupled to said terminal, for transferring video signals to a summing node, said first signal path having negligible phase shift over said given band of frequencies; and
   a second signal path, coupled to said terminal, for effecting a modulation of video signals by the sound signals and for transferring said sound modulated video signals to said summing node;
   the resulting signal formed by the combination of the signals transferred by said first signal path and the signals transferred by said second signal path at said summing node being substantially free of said intermodulation distortion effected by said recovery means.

2. The apparatus according to claim 1 wherein said second signal path includes:

a first non-linear signal path for generating first intermodulation products between said video and sound signals; and a second non-linear signal path for generating second intermodulation products of magnitude substantially equal to the magnitude of said first intermodulation products;

the resulting signal formed by the combination of said first and second non-linear signal paths at said summing node being substantially free of odd order intermodulation products.

3. The apparatus according to claim 2 wherein said first non-linear signal path comprises a semiconductor diode and wherein said second non-linear signal path comprises another semi-conductor diode.

4. In a recording system for information recovery of video and sound signals, said player including means for recovering modulated information signals including composite color video signals occupying a given band of frequencies with sound accompaniment from a disc record, said recovery means effecting intermodulation distortion between said video and sound signals; means for demodulating said information signals; means, coupled to said demodulating means, for processing said demodulated signals; and a non-linear compensator, coupled to said recovery means, for effecting a substantial removal of said intermodulation distortion, said non-linear compensator, comprising;

means, coupled to said recovery means, for generating a correction signal complementary to said intermodulation distortion effected by said recovery means;

means, coupled to said recovery means, for transferring video signals, said transferring means effecting negligible phase shift over said given band of frequencies;

means for combining the correction signal generated by said generating means and the video signals transferred by said transferring means such that the complementary correction signal effectively eliminates the intermodulation distortion in said transferred video signals.

5. The apparatus according to claim 4 wherein said generating means comprises:

a first non-linear signal path for generating first intermodulation products between said video and sound signals; and a second non-linear signal path for generating second intermodulation products of magnitude substantially equal to the magnitude of said first intermodulation products;

the resulting signal formed by the combination of said first and second non-linear signal paths being substantially free of odd order intermodulation products.

6. The apparatus according to claim 5 wherein said first non-linear path comprises a semiconductor diode and wherein said second non-linear path comprises another semiconductor diode.

7. In a disc record player for information recovery of video and sound signals, said player including means for recovering modulated information signals including composite color video signals occupying a given band of frequencies with sound accompaniment from a disc record, said composite color video signals containing a plurality of undesired interference components in said given band of frequencies; means for demodulating said information signals, means, coupled to said demodulating means, for processing said demodulated signals, and a non-linear compensator, for effecting a substantial removal of said undesired interference components, said non-linear compensator comprising:

a terminal;

a linear signal path, coupled to said terminal, for transferring signals having said undesired interference components to a summing node, said first signal path having a negligible phase shift over said given band of frequencies;

a first non-linear signal path, coupled to said terminal, for transferring signals to said summing node and for generating a correction signal complementary to a first undesired interference component; and a second non-linear signal path, coupled to said terminal, for transferring signals to said summing node and for generating another correction signal complementary to a second undesired interference component;

the resulting signal formed by the combination of the signals from the linear signal path and the first and second non-linear signal paths at said summing node being substantially free of said first and second undesired interference components.

* * * * *